United States Patent [19]

Davis

[11] Patent Number: 4,997,566

[45] Date of Patent: Mar. 5, 1991

[54] INCLINED STATIC FILTER FOR SEPARATING SOLIDS FROM LIQUIDS

[76] Inventor: Richard D. Davis, 5421 Southern Comfort Dr., Tampa, Fla. 33634

[21] Appl. No.: 457,031

[22] Filed: Dec. 26, 1989

[51] Int. Cl.⁵ ............................................... 210 433.1
[52] U.S. Cl. ............................. 210/433.1; 209/273; 209/677; B01D/21/24
[58] Field of Search ................... 210/433.1; 209/675, 209/677, 273, 393, 395

[56] References Cited

U.S. PATENT DOCUMENTS 4,113,626 9/1978 Detcher .......................... 210/433.1
4,250,038 2/1981 Dryden .......................... 210/433.1

Primary Examiner—Bernard Nozick
Attorney, Agent, or Firm—Joseph C. Mason, Jr.; Ronald E. Smith

[57] ABSTRACT

A structure placed in a stream of liquids, carrying undissolved solids, that separates the solids from the liquid and disposes of the solids. Two channels or conduits for carrying the liquid are positioned at different elevations and the structure is angularly disposed between the two channels or conduits to interconnect them. The structure includes plural interleaved plate members, one set of which is downwardly inclined at a first angle and a second set of which is downwardly inclined at a second, lesser angle. The solids collect atop the top edges of the plates inclined at the lesser angle as those plates gradually evolve from the other plates along their extent. A conveyor member at the bottom of the lesser inclined plate members carries the collected solids away.

13 Claims, 3 Drawing Sheets

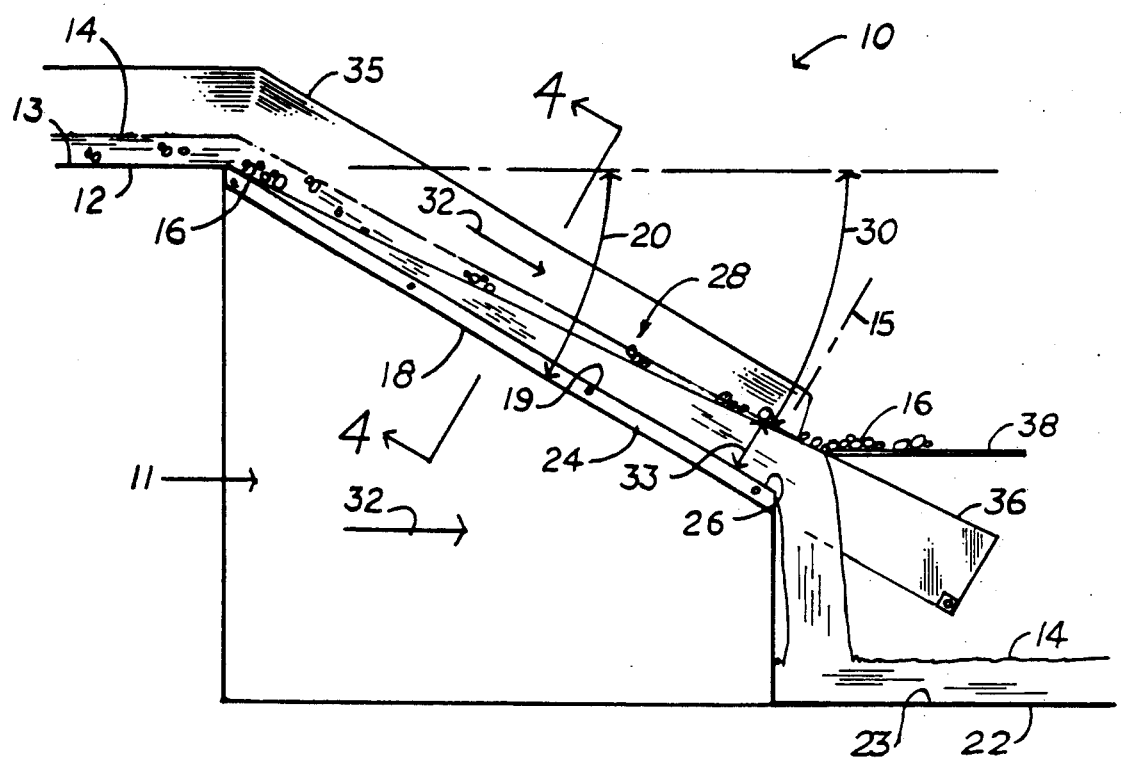
Fig_5
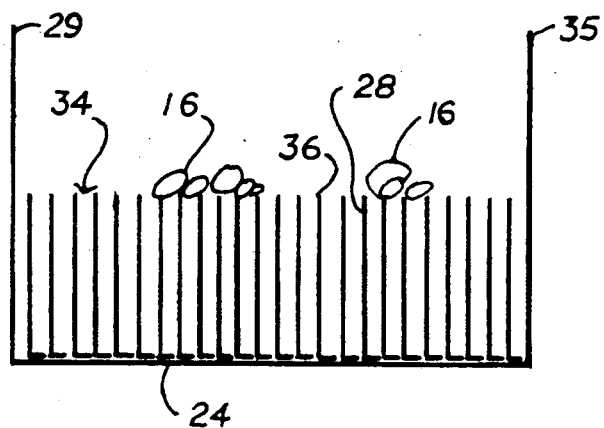
Fig_6

INCLINED STATIC FILTER FOR SEPARATING SOLIDS FROM LIQUIDS

TECHNICAL FIELD

This invention relates, generally, to devices that separate solids from liquids. More particularly, it relates to an inclined device that extends between two liquid streams disposed at differing elevations.

BACKGROUND ART

There are dozens of prior art disclosures of mechanical and static devices that have utility in connection with the separation of solids from liquids. Most of the devices have numerous moving parts and as such are mechanically complicated. Typically, a rotating screen is transversely disposed in a longitudinally flowing stream of liquid and hook members carried by the screen lift debris therefrom; the debris is usually delivered by the hooks to a hopper for disposal. Examples of such devices are shown and described in U.S. Pat. Nos. 1,864,359 to Laughlin et al., 2,489,454 to Henno, 2,885,080 to Goldman, and 3,526,589 to Meller et al.

It is clear that an effective separator of solids and liquids having no moving parts would be of great utility and would save government and industry a substantial amount in equipment maintenance and energy costs. However, the prior art neither teaches nor suggests how such a device could be supplied.

DISCLOSURE OF THE INVENTION

The present invention teaches that solids can be removed from liquids carrying solids by directing a stream of liquids from a first channel or conduit at a first elevation to a second channel or conduit at a second, lower elevation by means of a unique static filter element that interconnects the two channels or conduits. In a first embodiment, the static filter element is formed of two sets of flat plate members oriented in a vertical plane. The plates are interleaved with one another and are disposed at different angles. The top edges of their respective uppermost ends are positioned at a common elevation, said common elevation being the same elevation of the floor of the first channel or conduit member, and the top edges of their respective lower ends are at different elevations. Thus, a second set of plate members evolves out of the first set of plate members along the entire extent of the static filter element. The angle of inclination is selected so that the top edge of the lower end of the second set of plates is vertically spaced above the highest level of liquid flowing in the liquid stream.

A suitable hopper or conveyor means positioned at the lower end of the second set of plates that evolve upwardly relative to the first set of plates collects or transports the solids collected thereatop to a disposal location.

In a second embodiment, the base plates of the first embodiment are truncated at a preselected point.

In a third embodiment, only one set of plates is employed. The first set of plates is replaced by an integrally formed interconnecting conduit member having the same construction as the first and second conduit members. The second set of plates is employed, in modified form; said second set is fixedly secured atop the conduit member and the resulting structure performs in exactly the same way as the first embodiment.

In a fourth embodiment, the interconnecting conduit member of the third embodiment is truncated at the preselected point where the base plates of the second embodiment are truncated, all of which will become more clear as this description proceeds.

The present invention represents an important advance in the art. Earlier static devices require greater elevation differential and are restricted to lesser capacities due to the limitations of their respective designs. Accordingly, the invention is new and useful. Moreover, it was not obvious, to those of ordinary skill in the art, at the time it was made, in view of the prior art taken as a whole.

It should therefore be understood that a general object of the present invention is to provide an improved means for separating solids from liquids in numerous applications such as food and chemical processing, pulp and paper mills, textiles and carpet mills, water and wastewater treatment, etc.

A more specific object is to provide a structure having substantially no moving parts that nonetheless is effective, economical and trouble-free.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understadding of the nature and objects of the invention, reference should be made to the following detailed description, taken in connection with the accompanying drawings, in which:

FIG. 5 is a longitudinal sectional view of a second embodiment; and

FIG. 6 is a transverse sectional view of a third embodiment.

Similar reference numerals refer to similar parts throughout the several views of the drawings.

BEST MODES FOR CARRYING OUT THE INVENTION

Figure 1:
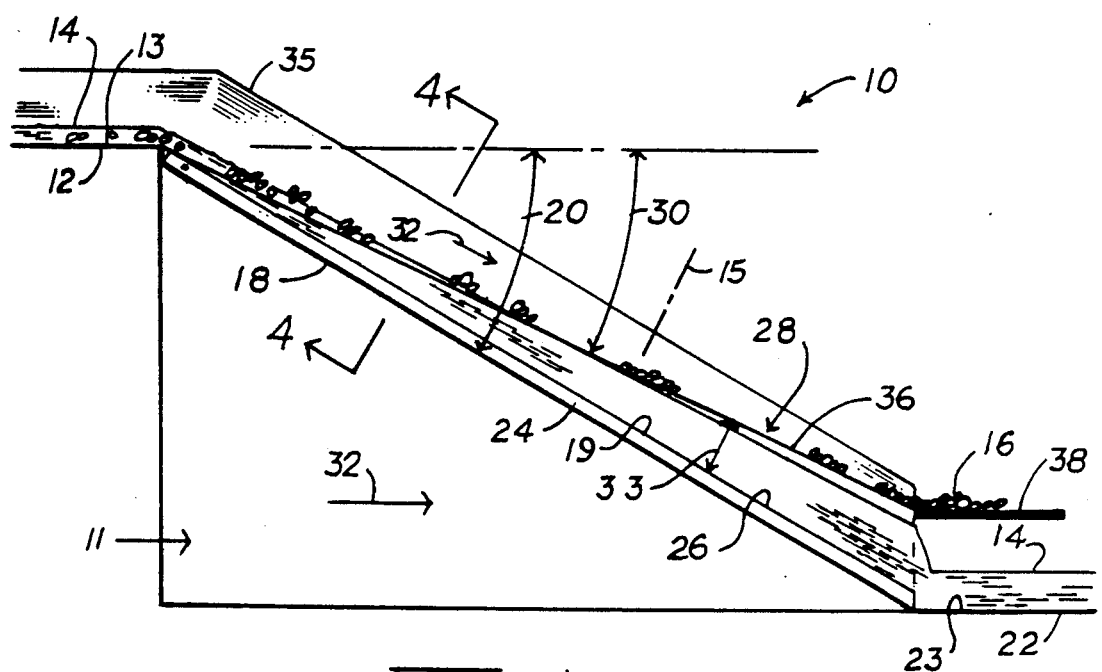
FIG. 1 is a longitudinal sectional view of the novel static filter in a typical application, said view being taken along line 1—1 in FIG. 2.

FIG. 1 depicts a typical environment of the type where the novel structure is used; the environment is denoted 10 as a whole.

A first, horizontally disposed trough or channel 12, having floor 13, carries liquids 14 and solids 16 and is disposed at a first or elevated position as shown.

A second channel 22, having floor 23, is horizontally disposed, is positioned downstream of inclined channel 18, and carries liquids 14 only.

A third channel 18 is positioned downstream of channel 12, and is angularly positioned relative to channel 12 at a predetermined angle 20; it interconnects the first and second channels.

Figure 2:
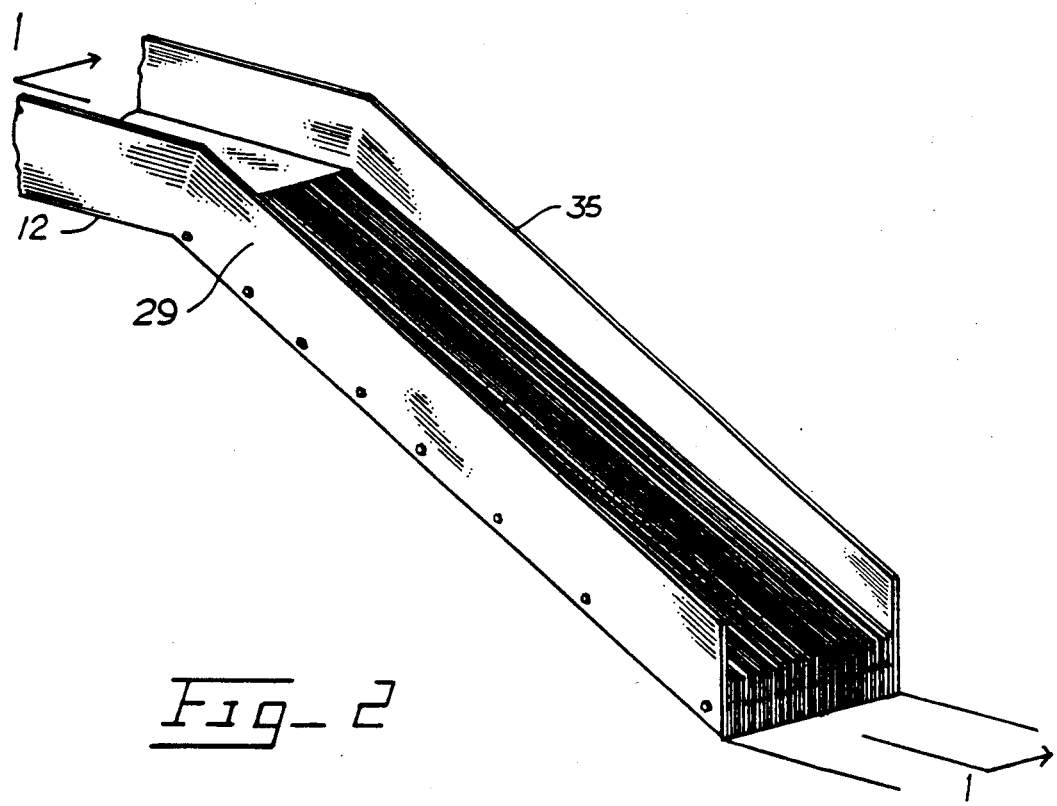
FIG. 2 is a perspective view of a first embodiment of the novel static filter.
Figure 3:
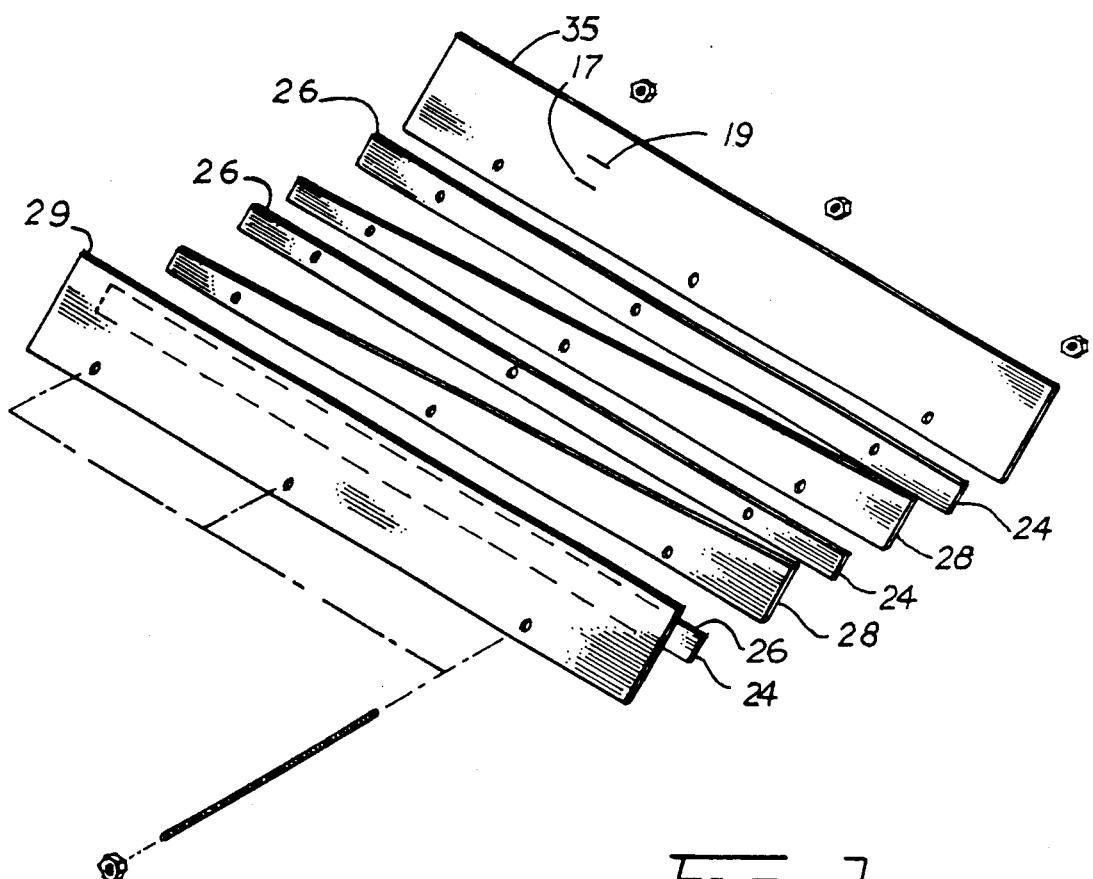
FIG. 3 is an exploded perspective view thereof.
Figure 4:
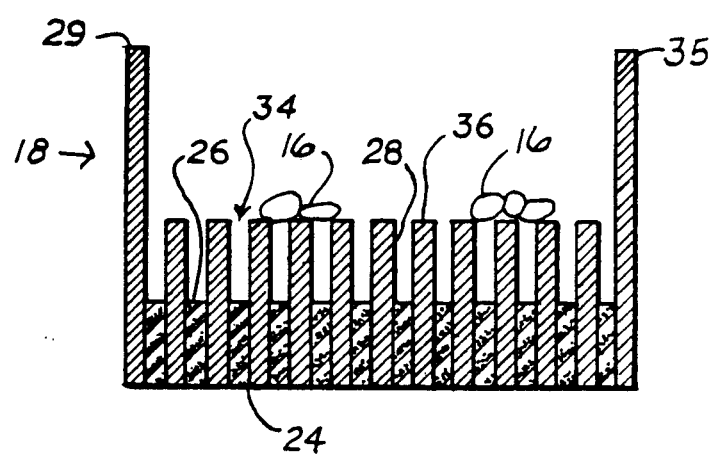
FIG. 4 is a transverse sectional view taken along line 4—4 in FIG. 1.

In a first embodiment, third channel 18 is formed in part by a plurality of flat base plate members, collectively denoted 24 in FIGS. 2-4. Plate members 24 may be of metallic construction as shown in FIG. 3, or of elastomeric construction as shown in FIG. 4, of PVC construction, not shown, or of other suitable construction as those skilled in the art of materials will appreciate.

Each plate 24, as perhaps best shown in FIG. 3, is generally planar in configuration. A predetermined number of said plates 24 are collectively aligned in a vertical plane in closely spaced parallel relation to one another as depicted. The top edges 26 of the plates 24 collectively form the bottom or floor 19 of channel 18. The sides of channel 18 are formed by a pair of laterally spaced side wall members 29, 35.

In FIG. 3, reference numeral 17 on side wall 35 represents a low water mark and numeral 19 represents a high water mark, i.e., although the top edges of side walls 29, 35 define the maximum depth of liquid flowing through the second channel 18, as a practical matter the level of liquid will usually be between marks 17 and 19.

Third channel 18 is also formed in part by a second plurality of flat plate members, hereinafter called filter plates and collectively denoted 28, that are also disposed in closely spaced, parallel relation to one another when channel 18 is assembled. More particularly, filter plates 28 are positioned in the respective spaces between the base plate members 24, i.e., they are interleaved with the base plates. Importantly, the top edge 36 of each filter plate 28 is coplanar with the top edge 26 of each base plate 24 only at the respective uppermost ends thereof, i.e., where the first and third conduits abut one another.

As perhaps best understood in connection with FIG. 4, water flowing in the third or intermediate conduit 18 cannot leak between plates 24 and 28. Thus, space 11 in FIG. 1 remains dry. This important feature of the novel construction is one of several features that distinguish it from the structures of the prior art.

For any predetermined plurality of base plates 24, there is one less filter plate 28.

Filter plates 28 are inclined at an angle 30, relative to the horizontal, that is less than angle of inclination 20 of the base plates 24, the significance of which is perhaps best understood in connection with FIGS. 1 and 5.

The top edges of the uppermost ends of the base and filter plate members 24, 28, respectively, are at a common elevation with the bottom 13 of first channel 12 as depicted in FIGS. 1 and 2 and as mentioned earlier. Thus, liquid flows substantially unimpeded from channel 12 to channel 18. However, the respective top edges of the lowermost ends of the plate members 24, 28 are vertically spaced from one another as shown, due to the aforementioned difference in angular disposition. Thus, the filter plates 28 gradually evolve from the base plates 24 in the direction of liquid flow 32 (FIG. 1). The respective bottom edges of the lowermost ends of the base plates 24 and the filter plates 28 are substantially coincident with the bottom 23 of downstream channel 22, but the top edges 36 of the filter plates 28 are spaced upwardly of the high water mark 19 of the liquid 14 so that solids 16 collected atop said top edges 36 are separated from said liquid as perhaps best understood in connection with FIG. 4.

In a preferred embodiment of the invention, the angle 33 between base plates 24 and filter plates 28 is about ten degrees, although that angle will vary in sundry applications. Moreover, empirical studies may demonstrate that a different angular orientation is optimal; the results of any such studies of course within the scope of this invention.

It should be clear, then, that liquid 14 will flow atop the collective top edges 26 of the base plates 24 for the entire extent of said base plates and between the filter plates 28 for at least a part of the extent of said filter plates. It should be equally clear that solids of any appreciable size will be unable to enter the interstitial spaces 34 between the filter plates 28, as best depicted in FIG. 4.

Importantly, as is perhaps best understood in connection with FIGS. and 5, solids 16 will gradually be lifted from the down flowing stream by the top edges 36 of said filter plates 28 as said top edges 36 gradually evolve from the top edges 26 of the base plates 24. The solids thus lifted from the stream are gravity fed to hopper or conveyor means 38 (FIGS. 1 and 5) at the lowermost end of channel 18 for disposal. Thus, the conveyor means, if needed, is the only part of the novel assembly of parts that has any moving parts.

The interaction of the base and filter plate members is an important feature of this invention. Specifically, as the liquid carrying the solids is applied to the novel structure, to be known commercially as the 3D static filter, the liquid 14 flows down the upper edges 26 of base plates 24 while the solids 16 are gradually elevated out of the liquid by the upper edges 36 of filter plates 28 which, as mentioned earlier, are coplanar with the base plate upper edges at their collective uppermost ends and which gradually rise therefrom. Thus, the liquid helps wash the solids down the top edges 36 of the filter plates 28.

In a preferred embodiment, a separation point 15 is defined where the top edges 36 of the filter plates 28 rise above the water level. This point 15 is about two-thirds of the way down channel or conduit 18, as shown in FIGS. 1 and 5. At that point, the head has doubled vis a vis its initial head at the top of channel 18. For example, in a typical installation, if the water is two inches deep at the top of channel 18, it will be four inches deep at the separation point. Thus, the upper two-thirds of the static filter element provides liquids-solids separation, and the lower one-third provides solids dewatering. In other words, the separation point divides the static filter 10 into a liquids-solids separation zone and a solid dewatering and liquid drain zone.

It should be noted that decreasing the thickness of the base plates 24 allows them and hence the filter plates 28 to be closer together, thereby straining even smaller in diameter particulates from the liquid stream.

Conversely, smaller particulates may be allowed to flow to channel 22 by increasing the thickness of the base plates and thus spacing the filter plates further apart.

Moreover, thicker filter plates can be employed in sludge dewatering applications to avoid shearing of the floc.

The following table shows the effect of increasing the thickness of base plates 24:

|  | Base Plate Thickness | Filter Plate Thickness | % of Space Occupied by Filter Plates | Increase in Depth of Liquid Flow |
| --- | --- | --- | --- | --- |
| Fine Screen | 1/16" | ⅛" | 66% | 3 times |
| Medium Screen | ⅛" | ⅛" | 50% | 2 times |
| Coarse Screen | ¼" | ⅛" | 33% | 1.5 times |

In a second embodiment, the base plates of the first embodiment terminate at the separation point 15 as depicted in FIG. 5, it being understood that once solids have been separated from the stream of liquids, no further purpose is served by said truncated base plates.

Those skilled in the mechanical arts will note that the interleaved construction that has been described is easy to assemble and is structurally very strong. However, the same work can be performed in a third embodiment by a structure that may be less desirable but which is nonetheless shown and claimed.

The structure shown in FIG. 6 has no base plates 24, per se, but the function of the base plates is performed by interconnecting conduit member 18 having flat, imperforate floor 24a and sidewalls 29, 35. The filter plates 36 in this third embodiment are formed of less materials than the filter plates 28 of the first and second embodiments, but are still of the same wedge shape, i.e., they have flat bottom edges and inclined top edges 36. They are spot welded or otherwise fixedly secured or integrally formed atop floor 24a of the interconnecting conduit. The top edges 36 of said filter plates 28 are inclined at a ten degree angular difference, approximately, from the angular orientation of the floor 24a of the interconnecting conduit 18, and said top edges thereof evolve from said floor in exactly the same way that said top edges evolved from the base plate top edges in the first and second embodiments; the separation point in this third embodiment is also about two-thirds of the way down the element 10 since this embodiment is the same in all other respects with the first embodiment.

In a fourth embodiment, not expressly shown, the imperforate floor 24a of the third embodiment terminates at separation point 15, producing the same effect as the truncated base plates of the second embodiment as depicted in FIG. 5.

The advantages of the novel structure are many. Since there are no moving parts, the static filter is economical to manufacture and requires no electrical energy to operate as do the rotating screens of the prior art. Moreover, it is self-cleaning and its maintenance requirements are nominal. Since the thickness of the plate members can be varied, varying degrees of liquids and solids separations can be achieved. The conveyor means also allows raw materials or by-products to be recovered for recycling purposes. There are many other features and advantages of the invention as those skilled in the art will appreciate.

This invention represents a significant breakthrough in the technology of static filters for removing solids from liquids. As such, it pioneers the art and the claims that follow are therefore entitled to broad interpretation, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A device that separates solids from liquids, comprising:

- a first channel means for carrying liquids and solids floating in said liquid;
- said first channel means being disposed at a first predetermined elevation;
- a second channel means for carrying liquids;
- said second channel means being disposed at a second predetermined elevation that is lower than said first predetermined elevation;
- a downwardly inclined interconnecting channel means that extends between said first and second channel means;
- said interconnecting channel means including a first part that is downwardly inclined at a first predetermined angle;
- said interconnecting channel means including a second part that is downwardly inclined at a second predetermined angle that is less than said first predetermined angle;
- said first part including a plurality of parallel, laterally spaced apart, vertically aligned base plate members;
- said second part including a plurality of parallel, laterally spaced apart, vertically aligned filter plate members;
- said base plate members and said filter plate members being disposed in interleaved configuration;
- said base plate members and said filter plate members having a first common elevated end;
- said first, common elevated end being disposed at said first elevation of said first channel means so that liquids and solids flow substantially unimpeded from said first channel means into said interconnecting channel means;
- said base plate members and said filter plate members having a second end spaced downwardly from said first end;
- said second end of said base plate members being disposed at a predetermined elevation substantially equal to the elevation of said second channel means so that liquids flowing over said base plate members flow substantially unimpeded into said second channel means;
- said second end of said filter plate member being disposed at a predetermined elevation above said second end of said base plate members;
- said first, second and intermediate channel means having a predetermined depth that limits the depth of the liquids flowing therethrough;
- said predetermined elevation of said second end of said filter plate members being a elevation above said liquids flowing through said channel interconnecting means;
- whereby liquids and solids carried by said liquids that are flowing from said first channel means into said channel interconnecting means initially flow over both said base plate members and said filter plate members;
- said solids being separated from said liquids intermediate said first elevated end of said channel interconnecting means and said second end thereof as said solids collect atop said filter plate members;
- said solids being washed down said filter plate members at least to some extent by liquids flowing over said base plate members;
- said solids sliding under the influence of gravity to said second end of said filter plate members; and a conveyor means disposed adjacent said second end of said filter plate members to carry away said solids.

2. The device of claim 1, wherein said base plate members are flat, planar in configuration members and wherein said base plate members have a common predetermined thickness.

3. The device of claim 2, wherein said filter plate members are flat, planar in configuration members and wherein said filter plate members have a common predetermined thickness.

4. The device of claim 3, wherein said first channel means includes a pair of laterally spaced apart, upstanding side wall members having a predetermined height that limits the maximum depth of said liquids flowing through said first channel means.

5. The device of claim 4, wherein said second channel means includes a pair of laterally spaced apart, upstanding side wall members having a predetermined height that limits the maximum depth of said liquids flowing through said second channel means.

6. The device of claim 5, wherein said interconnecting channel means includes a pair of laterally spaced apart, upstanding side wall members having a predetermined height that limits the maximum depth of said liquids flowing through said interconnecting channel means.

7. The device of claim 1, wherein a top edge of each filter plate member is disposed in coplanar relation to a top edge of each base plate member at a first, upper end of said interconnecting channel means.

8. The device of claim 7, wherein a top edge of each filter plate member is spaced vertically upwardly of a top edge of each base plate member at a second, lower end of said interconnecting channel means.

9. The device of claim 8, wherein a separation point is defined where a top edge of each filter plate member emerges above the surface of liquids flowing down said interconnecting channel means.

10. The device of claim 9, wherein said separation point is about two-thirds down the extent of said channel interconnecting means relative to said first, upper end thereof.

11. A device for separating solids and liquids, comprising:
a first conduit having an imperforate floor and upstanding sidewalls that limit the depth of liquid flowing therethrough;
said first conduit being generally horizontally disposed at a first preselected elevation;
a second conduit being generally horizontally disposed at a second preselected elevation;
said second conduit being generally horizontally disposed at a second preselected elevation below said first preselected elevation;
said first and second conduits being longitudinally spaced from one another;
a downwardly inclined third conduit being disposed in interconnecting relation to said first and second conduits;
said third conduit including a plurality of flat, imperforate base plates and a plurality of flat, imperforate filter plates interleaved therewith;
said base plates and said filter plates being collectively vertically aligned in parallel relation to one another and being disposed in tightly abutting relation to one another so that water flowing thereover is substantially prevented from leaking therebetween;
said base plates being collectively downwardly inclined at a first, common predetermined angle; and
said filter plates being collectively downwardly inclined at a second, common predetermined angle that is less than said first predetermined angle.

12. The device of claim 11, wherein said base plates have top edges that collectively define the floor of said third conduit.

13. The device of claim 12, wherein said base plates and said filter plates have a common longitudinal extent.

* * * * *